3,170,891
SILICONE ISOCYANATES
John L. Speier, Midland, Mich., assignor to Dow Corning Corporation, Midland, Mich., a corporation of Michigan
No Drawing. Filed Sept. 14, 1962, Ser. No. 223,801
22 Claims. (Cl. 260—37)

This invention relates to organosilicon isocyanates. More specifically, this invention relates to organosilicon compounds wherein the isocyanate functional radical is attached to silicon through silicon to carbon linkages.

The isocyanate radical is an extremely reactive one. It can be used, for example, in cross-linking reactions such as in polyurethanes. It can also be used, for example, in reactions with amines whereby new chemical compounds are made. The isocyanate radical will react with any active hydrogen, such as hydrogen attached to oxygen, nitrogen and sulfur in organic and organosilicon compounds. The product of the reaction between the isocyanate radical and active hydrogen is a urethane-type or a urea link, one which imparts hydrocarbon solvent and oil resistance to compounds containing them. One of the most common uses of the isocyanate function is in cross-linking polyethers and polyesters to make such as polyurethane rubbers and resins.

It is an object of the present invention to provide new organosilicon isocyanates. A further object of this invention is to provide novel organosilicon isocyanates wherein the said isocyanate radical is attached to silicon through a hydrocarbon radical. These and other objects will become apparent from the following description.

This invention relates to a composition of matter of the structure

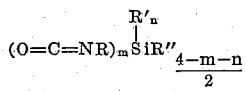

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals each free of aliphatic unsaturation, R" is selected from the group consisting of divalent oxygen radicals, divalent hydrocarbon radicals, divalent hydrocarbon ether radicals having no more than one oxygen atom attached to any one carbon atom therein, and divalent haloarylene radicals, each free of aliphatic unsaturation, $m$ has a value from greater than 0 to 1 inclusive, and $n$ has a value from 0 to 3 inclusive, such that the sum of $m+n$ averages at least 1.

In the composition above, R can be any divalent hydrocarbon or hydrocarbon ether radical as stated above. Examples of applicable radicals include alkylene radicals such as methylene, ethylene, isopropylene and octadecylene; cycloalkylene radicals such as cyclopentylene and cyclohexylene; alkarylene radicals such as phenethylene; and corresponding ether radicals such as

—CH$_2$CH$_2$OCH$_2$CH$_2$CH$_2$— and

Any one or more of the said radicals can be present in the composition above.

As stated above, R' can be any monovalent hydrocarbon or halohydrocarbon radical, each free of aliphatic unsaturation. Examples include alkyl radicals such as methyl, ethyl, isopropyl and octadecyl; cycloalkyl radicals such as cyclobutyl and cyclohexyl; aryl radicals such as phenyl, xenyl and naphthyl; alkaryl radicals such as tolyl and xylyl; aralkyl radicals such as benzyl and phenethyl; and halogenated derivatives of the above said radicals such as chloromethyl, 3,3,3-trifluoropropyl, tetrachlorophenyl, dibromonaphthyl and 2,3-dichlorocyclopentyl.

Radical R' above can be divalent oxygen or any divalent radical as above stated. Examples of divalent radicals include alkylene radicals such as methylene, ethylene and octadecylene; cycloalkylene radicals such as cyclobutylene and cyclohexylene; arylene radicals such as phenylene and biphenylene; alkarylene radicals such as

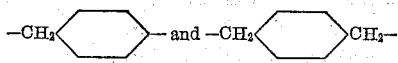

hydrocarbon ether radicals such as

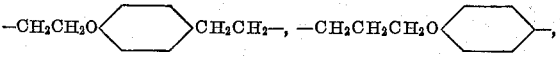

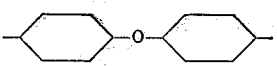

and haloarylene radicals such as

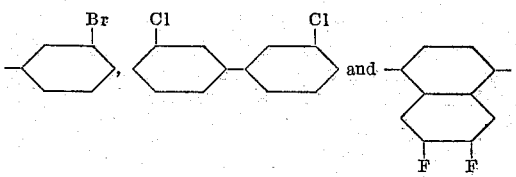

In the composition above, $m$ can have an average value of from greater than 0 to 1 inclusive. By greater than 0 is meant that there is an average of at least one radical containing the isocyanate function per molecule of the instant composition. When $m$ has an average value of 2 per molecule of the instant organosilicon composition, the instant composition averages difunctional with respect to the isocyanate radical. A composition of this configuration can be used in polymerization reactions with, for example, difunctional amines or hydroxy compounds to produce linear high polymers.

When $m$ equals 1, each silicon atom has attached thereto a radical containing the isocyanate function. When $m$ is 1 and $n$ is 3, there is obtained a monomeric silane. When $m$ is 1 and $n$ is 2, there is obtained a disilylcarbane, disiloxane or disilylcarbane ether, depending on the nature of radical R". When $m$ is one and $n$ is less than 2, a polymeric organosilicon compound is obtained which has a functionality with respect to the isocyanate radical which is equal to the average number of silicon atoms per molecule. When $m$ is less than 1 some of the silicon atoms have isocyanate groups attached thereto and some do not.

In the composition above, $n$ can have an average value of from 0 to 3 inclusive, provided that the sum of $m+n$ averages at least 1. Beyond this limitation, the value of $n$ can be anywhere within the range stated. When it is desired that the instant composition be an essentially linear polymer, the sum of $m+n$ should average about 2. An essentially linear molecule that is essentially difunctional with respect to the isocyanate function is obtained when $m$ has an average value of 2 per molecule and $m+n$ has an average value of 2 per silicon atom.

It can be seen from the above consideration that the instant composition can be a monomeric silane, or can be a polymeric silicarbane, silicarbane ether, siloxane or combinations thereof. In addition, the instant composition can comprise mixtures of two or more of the above configurations. Further, polymeric configurations can be linear or resinous.

The instant composition can be prepared in either of two ways. In the first method there is reacted a composition of the structure

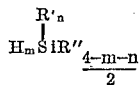

wherein R', R", m and n have the same meaning as for the composition of the invention, with an alkenyl isocyanate or alkenyl isocyanate ether. Suitable isocyanates include, for example,

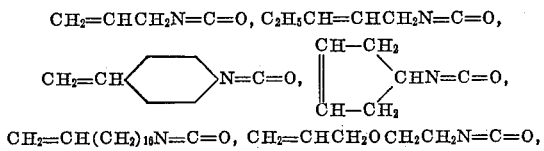

and

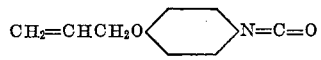

The reaction is normally accelerated by such catalysts as platinum, platinum salts and chloroplatinic acid. The reaction will often proceed at room temperature. However, higher temperatures are preferred in that the reaction proceeds at a more rapid rate. From the reaction there is obtained the composition of the invention, there being an isocyanate-bearing radical wherever there was a silicon-bonded hydrogen atom in the starting compound. The schematic addition reaction of the silicon-bonded hydrogen radical to the alkenyl group is illustrated by the following equation:

$$\equiv SiH + CH_2=CH- \xrightarrow{(cat.)} \equiv SiCH_2CH_2-$$

A second method of preparation is to react a composition of the formula

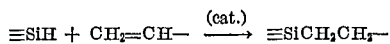

wherein R, R', R", m and n have the same meaning as for the composition of the invention with

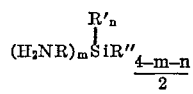

The product,

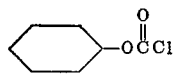

decomposes upon heating to yield phenol and the instant composition.

The isocyanates of this invention are stable for an indefinite period of time in the absence of moisture. Upon exposure to moisture these compositions will react therewith, causing polymerization of the composition.

The monoisocyanates of this invention are useful as catalysts in siloxane polymerization reactions, as, for example, per the method disclosed in U.S. Patent No. 3,032- ... can be employed pare polyether urethanes, or in the polymerization of hydroxylated polyesters to prepare polyester urethanes. In these latter uses, there can be obtained a copolymer of a polyether or polyester with organosilicon compounds. In addition, the instant compounds containing therein two or more isocyanate radicals per molecule can be utilized as the isocyanate component in the organosilicon ether-hydrocarbon polyether urethane copolymers disclosed in the applicaiton of Loren A. Haluska, Serial Number 223,807, filed simultaneously herewith on September 14, 1962, and entitled "Organosiloxane-Polyether Urethanes."

A further use for the instant composition is a moisture-sensitive organosilicon compound, which compound, while stable in the absence of moisture, cures on exposure to such as atmospheric moisture to a coherent solid such as a resin or a rubber. Such uses a calking, sealing and coating are contemplated in this regard. When it is desired to so employ the instant composition, various materials can be included, if desired, in the uncured compound. Such materials may be used as are normally employed in silicone rubber and resin formulations. These include, for example, fillers, such as carbon black, silica aerogel, silica xerogel, fume silica, silicas having on the surface thereof organosilyl groups, earth silicas, powdered metals, metal oxides, metal carbonates, talc, wood flour, asbestos, or combinations, thereof, compression set additives, plasticizers, pigments, oxidation inhibitors, etc. If one or more of the above said materials are mixed with the instant composition and it is desired that the mixture be stored before use for a substantial length of time, it is important that the said materials be essentially moisture-free.

If desired, the instant compositions can be reacted with organic compounds or organosilicon compounds containing active hydrogen, whereby the isocyanate radical reacts therewith. Organic compounds and organosilicon compounds containing active hydrogen are those wherein there is hydrogen attached to oxygen, sulfur or nitrogen. This includes alcohols, acids, sulfur derivatives thereof, amines, amides, etc., and silanols, silanethiols, silylamines, etc. When the instant composition is a polyisocyanate (two or more isocyanate radicals per molecule), the above said compounds will polymerize the instant composition.

This invention also relates to silane isocyanates of the structure

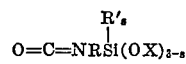

wherein R and R' have the meaning already given above, X is an alkyl, aryl, aralkyl or alkaryl radical, and s is an integer from 0 to 2 inclusive.

Radical X can be any radical as stated above. Thus, the said radical can be alkyl such as methyl, ethyl, isopropyl, t-butyl and octadecyl; aryl such as phenyl, xenyl and naphthyl; aralkyl such as benzyl and phenylethyl; and alkaryl such as tolyl and xylyl. Radical X can be the same or different in any one composition. Preferred radicals are the lower alkyl radicals containing less than about 6 carbon atoms therein. These preferred radicals are more readily available and confer greater reactivity to the silane with respect to the radical to which they are attached.

As stated above s is an integer from 0 to 2 inclusive; thus, the silane isocyanate can have the following configurations:

The silane isocyanate can have any one of the above configurations, and X in any case can be one or more radicals as above stated. In addition, the silane isocyanate can be a mixture of 2 or all 3 of the above configurations.

The silane isocyanates are prepared in a manner similar to the organosilicon isocyanates described. Preferably, the first method comprises reacting a silane of the formula

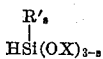

wherein R', X and $s$ are as already defined, with an alkenyl isocyanate or an alkenyl isocyanate ether, examples of which appear above. The reaction produces the instant silane isocyanate. In the second method, a silane of the formula

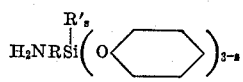

wherein R, R' and $s$ have the same meaning as above, for reacting with

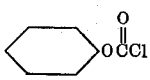

The

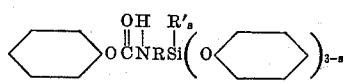

decompositions upon heating to yield phenol and the instant silane isocyanate. The second method is restricted to phenoxysilane because of the probability of phenol interchange if other organoxy radicals are present.

The silane isocyanates of this invention are stable in the absence of moisture for an indefinite period of time. Upon exposure to moisture these compounds react therewith to cause polymerization of the compositions.

The above silane isocyanates can be employed as siloxane polymerization catalysts in, for example, the method disclosed in U.S. Patent 3,032,530. A further use for the instant silane isocyanates is in the reaction of the isocyanate function with organic compounds or organosilicon compounds which contain active hydrogen (hydrogen attached to oxygen, sulfur or nitrogen) to introduce by the reaction a silicon atom thereon, the said silicon atom having attached thereto one or more functional —OX radicals. An example illustrating the above described reaction is as follows:

$2[O=C=N(CH_2)_3Si(OCH_3)_3] + HO(CH_2CO_2O)_{20}H \longrightarrow$

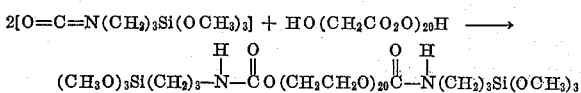

In the above illustration the organic hydroxylated polyether has been endblocked with —Si(OCH$_3$)$_3$ radicals, which radicals can be utilized in further reactions, such as polymerization and curing by suitable reagents to give, in this case, a resinous cross-linked high polymer. By the proper choice of materials per above, reaction products can be made which can be further cured to high polymers, rubbers, resins, fluids, and coatings. This method provides an excellent way to introduce silicone reactivity into non-silicone organic materials, and to, if desired, increase the functionality of the compound containing active hydrogen.

The following examples are illustrative only and should not be construed as limiting the invention which is properly delineated in the appended claims. In the examples the symbols, Me, Et and Pr are employed to represent the methyl, ethyl and propyl radicals, respectively.

*Example 1*

6.09 g. of a dimethylhydrogensiloxy endblocked dimethylpolysiloxane (containing 10.3 milliequivalents of silicon-bonded hydrogen) were mixed with 1.834 g. of an alkenyl isocyanate of the structure $$CH_2=CH(CH_2)_9N=C=O$$

at 150° C. in the presence of a catalytic amount of chloroplatinic acid. There was obtained the product of the structure

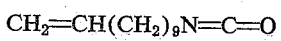

The compound above was reacted with an organosilicon diamine of the structure

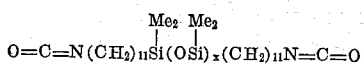

Reaction proceeded spontaneously at room temperature to produce a urea polymer of the unit structure

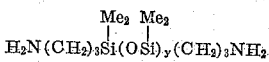

*Example 2*

3.35 g. of siloxane of the structure

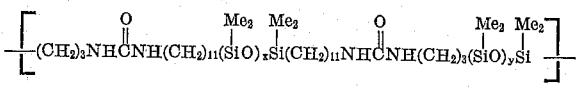

were reacted with 1.8 g. of the alkenyl isocyanate of Example 1 under the same conditions as in Example 1. There was formed the compound of the structure

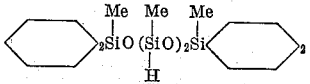

This compound was reacted with ethylene diamine. The reaction proceeded at room temperature to produce a gel urea structure.

*Example 3*

When the following alkenyl isocyanates are reacted with the following organic compounds containing SiH by the procedure of Example 1, products as shown are obtained:

| Isocyanate | SiH Compound |
|---|---|
| 1. $CH_2=CHCH_2N=C=O$ | 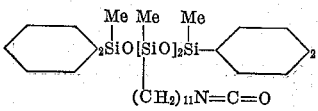 |
| 2. $CH_2=CHCH_2O(CH_2)_6N=C=O$ | |
| 3. $O=C=NCH\begin{matrix}CH_2-CH\\ \|\\ CH_2-CH\end{matrix}$ | |

| Isocyanate | SiH Compound |
|---|---|
| 4. CH$_2$=CH−⟨C$_6$H$_4$⟩−N=C=O | HSi[(C$_6$H$_4$)−OSi(Me)−OSi(Me)−(C$_6$H$_4$)−Br]$_3$ (with OSi(Me) repeated 3×) |
| 5. CH$_2$=CHCH$_2$O−⟨C$_6$H$_4$⟩−N=C=O | MeSiH(C$_6$H$_{11}$)(Pr) |
| 6. CH$_2$=CH(CH$_2$)$_9$N=C=O | HSi(Me)$_2$(CH$_2$)$_6$SiH(Me)$_2$ |
| 7. CH$_2$=CH(CH$_2$)$_9$N=C=O | HSi[⟨C$_6$H$_4$⟩−CH$_2$−⟨C$_6$H$_4$⟩−SiMe$_3$]$_3$ |
| 8. CH$_2$=CH(CH$_2$)$_9$N=C=O | [HSi(Me)(CH$_2$)$_3$−O−CH$_2$−CH$_2$−CF$_3$]$_2$ |
| 9. CH$_2$=CH(CH$_2$)$_9$N=C=O | HSi(Me)(2,Cl-C$_6$H$_3$(S−C$_6$H$_3$Cl$_2$))−O−(2,Cl-C$_6$H$_3$(S−C$_6$H$_3$Cl$_2$))−SiH(Me) |
| 1. CH$_2$=CHCH$_2$N=C=O | O=C=N(CH$_2$)$_3$Si(Me)$_2$−⟨C$_6$H$_4$⟩−Si(Me)$_2$(CH$_2$)$_3$N=C=O |
| 2. CH$_2$=CHCH$_2$O(CH$_2$)$_6$N=C=O | [(S−C$_4$H$_8$)Si(CH$_2$CH$_2$Cl)O$_{1/2}$]$_2$[Si(Me)O(CH$_2$)$_3$O(CH$_2$)$_6$N=C=O]$_{15}$ |
| 3. O=C=NCH(CH$_2$−CH)(CH$_2$−CH) | (⟨C$_6$H$_5$⟩CH$_2$SiCH$_2$(Me)(C$_{18}$H$_{37}$))$_2$SiCH(Et)(CH$_2$−CH$_2$)(CH$_2$−CHNCO) |
| 4. CH$_2$=CH−⟨C$_6$H$_4$⟩−N=C=O | O=C=N−⟨C$_6$H$_4$⟩−CH$_2$CH$_2$Si[⟨C$_6$H$_4$⟩−OSi(Me)−OSi(Me)−⟨C$_6$H$_4$⟩−Br]$_3$ |
| 5. CH$_2$=CHCH$_2$O−⟨C$_6$H$_4$⟩−N=C=O | ⟨C$_6$H$_{11}$⟩Si(Pr)CH$_2$CH$_2$CH$_2$O−⟨C$_6$H$_4$⟩−N=C=O |
| 6. CH$_2$=CH(CH$_2$)$_9$N=C=O | [O=C=N(CH$_2$)$_{11}$Si(Me)(CH$_2$)$_3$]$_2$ |
| 7. CH$_2$=CH(CH$_2$)$_9$N=C=O | O=C=N(CH$_2$)$_{11}$Si[⟨C$_6$H$_4$⟩−CH$_2$−⟨C$_6$H$_4$⟩−SiMe$_3$]$_3$ |
| 8. CH$_2$=CH(CH$_2$)$_9$N=C=O | O[(CH$_2$)$_3$Si(Me)(CH$_2$)$_{11}$N=C=O]$_2$ with CH$_2$CH$_2$CF$_3$ |

| Isocyanate | SiH Compound |
|---|---|
| 9. $CH_2=CH(CH_2)_9N=C=O$ | 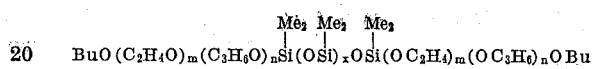 |

Example 4

When 100 parts of the organosilicon isocyanate of the structure

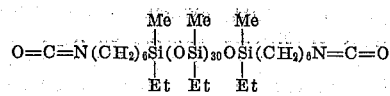

$$O=C=N(CH_2)_6Si(OSi)_{30}OSi(CH_2)_6N=C=O$$

(with Me/Me/Me above and Et/Et/Et below the Si atoms)

is mixed with any of the following materials, mixtures are obtained which cure to a coherent solid when exposed to atmospheric moisture.

(A) 30 parts of ground quartz,
(B) 20 parts of a fume silica,
(C) 5 parts of carbon black and 50 parts of diatomaceous earth,
(D) 50 parts of zinc oxide and 25 parts of calcium carbonate,
(E) 40 parts of a silica having on the surface thereof $Me_3Si$ groups, and 6 parts of lead iron oxide pigment.

Example 5

When a rapidly stirred mixture of the composition: 100 parts of a polyether of the structure

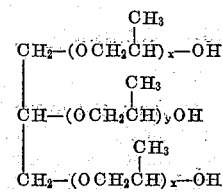

having a molecular weight of about 3,000, 2.9 parts of water, 0.7 part of triethylenediamine and one part of a surfactant of the structure $$BuO(C_2H_4O)_m(C_3H_6O)_nSi(OSi)_xOSi(OC_2H_4)_m(OC_3H_6)_nOBu$$

in which $x$ has an average value of about 30 and the propylene oxide and ethylene oxide units are about equal in weight ratio, has added thereto 65.5 g. of a siloxane diisocyanate of the structure $$[O=C=N(CH_2)_3Si]_2O$$

(with $Me_2$ on Si)

with vigorous stirring for a few seconds, and thereafter the mass is allowed to foam and cure, a good flexible polyether foam is formed thereby.

Example 6

When the isocyanate product of Example 2 is mixed with a hydroxyl-endblocked dimethylpolysiloxane having a viscosity of 5,000 cs. at 25° C., and the mixture heated for several hours, the viscosity of the dimethylpolysiloxane will increase, showing polymerization thereof.

Example 7

Silane isocyanates are formed as shown below when the following silanes are reacted with the following alkenyl isocyanates or alkenylisocyanate ethers per the procedure of Example 1:

| Silane | Isocyanate | Product |
|---|---|---|
| $HSi(OMe)_3$ | $CH_2=CH(CH_2)_9N=C=O$ | $O=C=N(CH_2)_{11}Si(OMe)_3$ |
| $HSi(OC_4H_9)_2$ (with Me) | $CH_2=CH\text{-}\bigcirc\text{-}N=C=O$ 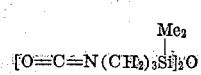 | $O=C=N\text{-}\bigcirc\text{-}(CH_2)_2Si(OC_4H_9)_2$ (with Me) |
| $HSiO\text{-}\bigcirc\text{-}$ (with Me, $C_{18}H_{37}$) | $CH_2=CH(CH_2)_3N=C=O$ | $O=C=N(CH_2)_5SiO\text{-}\bigcirc\text{-}$ (with Me, $C_{18}H_{37}$) |
| $HSi(OC_3H_7)_2$ (with $CH_2CH_2CF_3$) | $CH_2=CHCH_2O(CH_2)_2CHN=C=O$ (with Me) | $O=C=NCH(CH_2)_2O(CH_2)_3Si(OC_3H_7)_2$ (with Me, $CH_2CH_2CF_3$) |
| $HSiOC_{18}H_{37}$ (with Me, Et) | $CH_2=CH(CH_2)_9N=C=O$ | $O=C=N(CH_2)_{11}SiOC_{18}H_{37}$ (with Me, Et) |
| $HSiOCH_2\text{-}\bigcirc$ (with $Me_2$) | $CH_2=CHCH_2N=C=O$ | $O=C=N(CH_2)_3SiOCH_2\text{-}\bigcirc$ (with $Me_2$) |

Example 8

When the silane of the formula $$H_2N(CH_2)_3Si(OC_6H_5)_3$$

is reacted with the compound $$C_6H_5OCOCl$$

and the product heated to expel phenol, a composition of the formula $$O=C=N(CH_2)_3Si(OC_6H_5)_3$$

is formed.

That which is claimed is:

1. A composition of matter of the structure $$(O=C=NR)_m SiR''_{\frac{4-m-n}{2}} \; | \; R'_n$$

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals, each free of aliphatic unsaturation, R" is selected from the group consisting of divalent oxygen radicals, divalent hydrocarbon radicals, divalent hydrocarbon ether radicals having no more than one oxygen atom attached to any one carbon atom therein, and divalent haloarylene radicals, each free of aliphatic unsaturation, $m$ has a value from greater than 0 to 1 inclusive and $n$ has a value from 0 to 3 inclusive, such that the sum of $m+n$ averages at least 1.

2. A composition of matter of the structure $$O=C=NRSiR''_{\frac{3-n}{2}} \; | \; R'_n$$

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals each free of aliphatic unsaturation, R" is selected from the group consisting of divalent oxygen radicals, divalent hydrocarbon radicals, divalent hydrocarbon ether radicals having no more than one oxygen atom attached to any one carbon atom therein, and divalent haloarylene radicals, each free of aliphatic unsaturation and $n$ has a value from 0 to 3 inclusive.

3. A composition of matter of the structure $$(O=C=NR)_m SiO_{\frac{4-m-n}{2}} \; | \; R'_n$$

wherein R is a divalent hydrocarbon radical free of aliphatic unsaturation, R' is a monovalent hydrocarbon radical free of aliphatic unsaturation, $m$ has a value from greater than 0 to 1 inclusive, and $n$ has a value from 0 to 3 inclusive, such that the sum of $m+n$ averages at least 1.

4. A composition of matter of the structure $$(O=C=NR)_m Si_{\frac{4-m-n}{2}} \; | \; R$$

wherein R is a divalent hydrocarbon radical free of aliphatic unsaturation, R' is a monovalent halohydrocarbon radical free of aliphatic unsaturation, $m$ has a value from greater than 0 to 1 inclusive, $n$ has a value from 0 to 3 inclusive, such that the sum of $m+n$ averages at least 1.

5. A composition of matter of the structure $$(O=C=NRSi)_2 R'' \; | \; R'_2$$

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals each free of aliphatic unsaturation, R" is selected from the group consisting of divalent oxygen radicals, divalent hydrocarbon radicals, divalent hydrocarbon ether radicals having no more than one oxygen atom attached to any one carbon atom therein, and divalent haloarylene radicals, each free of aliphatic unsaturation.

6. A composition of matter of the structure $$O=C=NRSi[OSi]_p OSiRN=C=O \; | \; R'_2 \; R'_2 \; R'_2$$

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals each free of aliphatic unsaturation, and $p$ has an average value of at least 1.

7. A composition of matter comprising (1) an organosilicon compound of the structure $$(O=C=NR)_m SiR''_{\frac{4-m-n}{2}} \; | \; R'_n$$

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals each free of aliphatic unsaturation, R" is selected from the group consisting of divalent oxygen radicals, divalent hydrocarbon radicals, divalent hydrocarbon ether radicals having no more than one oxygen atom attached to any one carbon atom therein, and divalent haloarylene radicals, each free of aliphatic unsaturation, $m$ has a value from greater than 0 to 1 inclusive, $n$ has a value from 0 to 3 inclusive, such that the sum of $m+n$ averages at least 1, and (2) a filler.

8. A composition of matter comprising (1) an organosilicon compound of the structure $$O=C=NRSi(OSi)_r OSiRN=C=O \; | \; R'_2 \; R'_2 \; R'_2$$

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals, each free of aliphatic unsaturation, and $r$ has an average value of at least 10, and (2) a filler.

9. The composition according to claim 1 wherein R" is oxygen.

10. A composition according to claim 1 wherein R' is methyl and R" is oxygen.

11. A composition according to claim 6 wherein R' is methyl.

12. A composition according to claim 6 wherein part of the R' radicals are 3,3,3-trifluoropropyl and part are methyl.

13. A composition according to claim 7 wherein R' is methyl and R'' is oxygen.

14. The composition according to claim 7 wherein component (2) is a silica.

15. The composition according to claim 8 wherein component (2) is a silica.

16. A composition of the formula

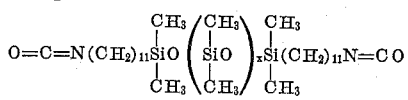

wherein $x$ has an average value of at least 1.

17. The compound of the formula

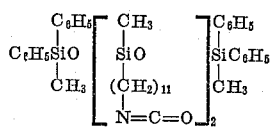

18. A composition of the formula

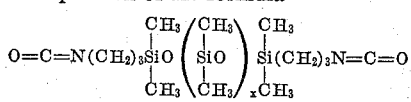

wherein $x$ has an average value of at least 1.

19. A composition of matter of the structure

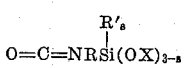

wherein R is selected from the group consisting of divalent hydrocarbon radicals and divalent hydrocarbon ether radicals having no more than one oxygen atom attached to any one carbon atom therein, each free of aliphatic unsaturation, R' is selected from the group consisting of monovalent hydrocarbon radicals and monovalent halohydrocarbon radicals, each free of aliphatic unsaturation, X is selected from the group consisting of alkyl radicals, aryl radicals, aralkyl radicals and alkaryl radicals, and $s$ is an integer from 0 to 2 inclusive.

20. A composition of matter of the structure

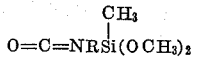

wherein R is selected from the group consisting of divalent hydrocarbon radicals and divalent hydrocarbon ether radicals having no more than one oxygen atom attached to any one carbon atom therein, each free of aliphatic unsaturation.

21. A composition of matter of the structure

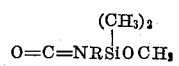

wherein R is selected from the group consisting of divalent hydrocarbon radicals and divalent hydrocarbon ether radicals having no more than one oxygen atom attached to any one carbon atom therein, each free of aliphatic unsaturation.

22. A composition of matter of the structure

wherein R is selected from the group consisting of divalent hydrocarbon radicals and divalent hydrocarbon ether radicals having no more than one oxygen atom attached to any one carbon atom therein, each free of aliphatic unsaturation.

References Cited in the file of this patent
UNITED STATES PATENTS 3,113,146     Fielding et al. _____ Dec. 3, 1963

FOREIGN PATENTS 1,066,582     Germany _____ Oct. 8, 1959

OTHER REFERENCES

"Silicones" (Fordham), published by George Newnes Ltd., London, 1960, pp. 161–166 relied on.

UNITED STATES PATENT OFFICE
CERTIFICATE OF CORRECTION

Patent No. 3,170,891                          February 23, 1965

John L. Speier

It is hereby certified that error appears in the above numbered patent requiring correction and that the said Letters Patent should read as corrected below.

Column 2, line 8, for "Radical R'" read -- Radical R" --; column 5, lines 44 to 47, the upper right-hand portion of the formula should appear as shown below instead of as in the patent:

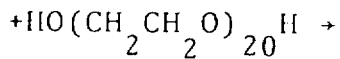

column 8, under the double line insert -- Product --; same column 8, the third formula under the double line should appear as shown below instead of as in the patent:

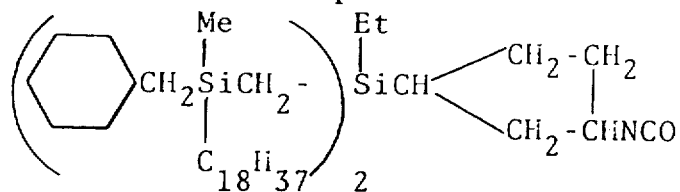

column 9, lines 37 to 45, the formulae should appear as shown below instead of as in the patent:

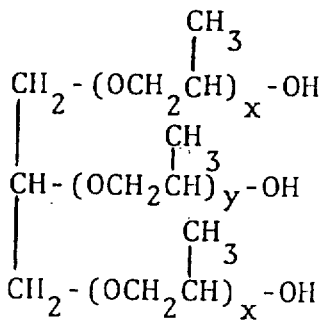

column 10, line 1, for "SiH Compound" read -- Product --; column 11, lines 72 to 75, the formula should appear as shown below instead of as in the patent:

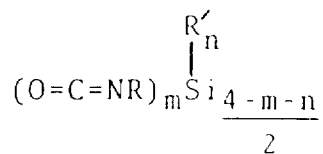

column 13, lines 13 to 16, for that portion of the formula reading:

N=CO                 read               N=C=O column 14, lines 15 and 16, the formula should appear as shown below instead of as in the patent:

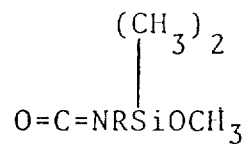

Signed and sealed this 3rd day of August 1965.

(SEAL)
Attest:

ERNEST W. SWIDER                          EDWARD J. BRENNER
Attesting Officer                      Commissioner of Patents